(12) United States Patent
Bunya et al.

(10) Patent No.: US 11,101,697 B2
(45) Date of Patent: Aug. 24, 2021

(54) POWER RECEPTION DEVICE AND CONTACTLESS POWER TRANSMISSION SYSTEM

(71) Applicant: Mitsubishi Electric Corporation, Tokyo (JP)

(72) Inventors: Jun Bunya, Tokyo (JP); Yoshiyuki Akuzawa, Tokyo (JP); Hiroshi Matsumori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/756,339

(22) PCT Filed: Oct. 30, 2017

(86) PCT No.: PCT/JP2017/039096
§ 371 (c)(1),
(2) Date: Apr. 15, 2020

(87) PCT Pub. No.: WO2019/087237
PCT Pub. Date: May 9, 2019

(65) Prior Publication Data
US 2020/0244107 A1 Jul. 30, 2020

(51) Int. Cl.
*H01F 5/00* (2006.01)
*H01F 17/00* (2006.01)
(Continued)

(52) U.S. Cl.
CPC ............ *H02J 50/12* (2016.02); *H02J 50/70* (2016.02); *H02J 50/90* (2016.02); *H04B 5/0037* (2013.01)

(58) Field of Classification Search
None
See application file for complete search history.

(56) References Cited

U.S. PATENT DOCUMENTS 7,907,044 B2 * 3/2011 Tada .................. H01F 3/14
336/200
7,994,889 B2 * 8/2011 Okabe .................. H01F 10/265
336/200

(Continued)

FOREIGN PATENT DOCUMENTS

JP 2006-314181 A 11/2006
JP 2012-223027 A 11/2012
(Continued)

OTHER PUBLICATIONS

International Search Report of the International Searching Authority dated Nov. 28, 2017 for the corresponding international application No. PCT/JP2017/039096 (and English translation).
(Continued)

*Primary Examiner* — Kenneth B Wells
(74) *Attorney, Agent, or Firm* — Posz Law Group, PLC

(57) ABSTRACT

A power reception device includes: a power reception coil that receives power by magnetic resonance; a power reception circuit that converts power received by the power reception coil into direct current; a load circuit that operates by the power into which the power is converted by the power reception circuit; a first substrate on which the power reception coil and the power reception circuit are mounted; and a second substrate on which the load circuit is mounted, the second substrate being located outside the power reception coil as viewed in an axial direction of the power reception coil.

10 Claims, 8 Drawing Sheets

(51) Int. Cl.
*H01F 27/28* (2006.01)
*H01F 27/30* (2006.01)
*H02J 50/12* (2016.01)
*H02J 50/90* (2016.01)
*H02J 50/70* (2016.01)
*H04B 5/00* (2006.01)

(56) References Cited

U.S. PATENT DOCUMENTS

| | | | |
|---|---|---|---|
| 8,400,248 B2 * | 3/2013 | Kim | H01Q 7/00 336/200 |
| 2011/0050164 A1 | 3/2011 | Partovi et al. | |
| 2012/0212069 A1 | 8/2012 | Kawano et al. | |
| 2012/0326520 A1 | 12/2012 | Konya | |
| 2013/0002035 A1 | 1/2013 | Oodachi et al. | |

FOREIGN PATENT DOCUMENTS

| | | |
|---|---|---|
| JP | 2013-013204 A | 1/2013 |
| JP | 2013-078243 A | 4/2013 |
| JP | 5790200 B | 10/2015 |
| JP | 5838562 B | 1/2016 |
| JP | 2016-129482 A | 7/2016 |

OTHER PUBLICATIONS

Extended European Search Report dated Aug. 5, 2020 issued in corresponding European patent application No. 17930775.6.

* cited by examiner

POWER RECEPTION DEVICE AND CONTACTLESS POWER TRANSMISSION SYSTEM

CROSS REFERENCE TO RELATED APPLICATION

This application is a U.S. national stage application of PCT/JP2017/039096 filed on Oct. 30, 2017, the contents of which are incorporated herein by reference.

TECHNICAL FIELD

The present disclosure relates to a power reception device that receives power in a contactless manner and according to a magnetic resonance method, and a contactless power transmission system including the power reception device.

BACKGROUND ART

In the related art, a cellular phone including the following power reception coil and circuit board is provided. The power reception coil receives power transferred from a power transmission coil using electromagnetic induction, and on the circuit board, a conversion circuit is mounted to convert alternating current induced in the power reception coil into direct current and output the direct current (see, for example, Patent Literature 1). This cellular phone includes a movable case that houses the power reception coil and a main-body case that houses the circuit board, and the movable case and the main-body case are provided as separate cases. The movable case is coupled to the main-body case such that the power reception coil can be separated from the circuit board.

Furthermore, in the related art, a wireless power transmission system is provided which transmits power using magnetic field resonance between a power transmission coil and a power reception coil (see, for example, Patent Literature 2). In a magnetic field resonance method, a power transmission device and a power reception device are provided with respective resonance circuits each employing a coil and a capacitor, and the resonance frequencies of these resonance circuits are made to coincide with each other, whereby power is transmitted from the power transmission device to the power reception device. In wireless power transmission by the magnetic field resonance method, it is possible to transmit power with a high efficiency even if the power transmission device and the power reception device are separated from each other to a certain extent. It should be noted that magnetic field resonance is also referred to as magnetic resonance.

CITATION LIST

Patent Literature

Patent Literature 1: Japanese Unexamined Patent Application Publication No. 2013-78243
Patent Literature 2: Japanese Patent No. 5838562

SUMMARY OF INVENTION

Technical Problem

In the technique described in Patent Literature 1, the movable case that houses the power reception coil is provided apart from the circuit board, thereby preventing the circuit board from malfunctioning because of electromagnetic wave noise of the power transmission coil. However, in the technique of Patent Literature 1, since power is transmitted by an electromagnetic induction method, the distance between the power transmission coil and the power reception coil needs to be short, as compared with the power transmission by the magnetic resonance method, and the position of the power reception device is restricted.

On the other hand, in the power transmission of the magnetic resonance method, for example, in that of the wireless transmission system described in Patent Literature 2, the distance between the power transmission coil and the power reception coil can be set great, as compared with the power transmission by the electromagnetic induction method, and the restriction on the position of the power reception device can be reduced.

However, if the power transmission by the magnetic resonance method is applied to the technique described in Patent Literature 1, such a combination gives rise to the following problems.

The frequency of power transmitted by magnetic resonance is higher than that of power transmitted by electromagnetic induction. For example, the frequency of power transmitted by electromagnetic induction is in the kHz band, whereas the resonance frequency of magnetic resonance is in the MHz band.

Thus, a loss caused by an inductance of a wire such as a lead connecting a power reception coil housed in a movable case and a circuit board (power reception circuit) housed in a main-body case is increased. Furthermore, a high-frequency noise is made in the wire such as the lead connecting the power reception coil and the circuit board, and causes the circuit board to malfunction.

The present disclosure is applied to solve the above problems, and relates to a power reception device and a contactless power transmission system that can reduce a power loss and a high-frequency noise between a power reception coil that receives power through magnetic resonance and a power reception circuit.

Solution to Problem

A power reception device according to an embodiment of the present disclosure includes: a power reception coil that receives power by magnetic resonance; a power reception circuit that converts power received by the power reception coil into direct current; a load circuit that operates by the directed current into which the power is converted by the power reception circuit; a first substrate on which the power reception coil and the power reception circuit are mounted; and a second substrate on which the load circuit is mounted, the second substrate being located outside the power reception coil as viewed in an axial direction of the power reception coil.

Advantageous Effects of Invention

In the power reception device according to the embodiment of the present disclosure, the power reception coil and the power reception circuit are mounted on the first substrate. Therefore, the inductance of a connection path between the power reception coil and the power reception circuit can be reduced to a small value, and a power loss and a high-frequency noise can be reduced, as compared with the case where the power reception circuit is mounted on the second substrate, which is provided separate from the first substrate.

DESCRIPTION OF EMBODIMENTS

Embodiment 1

(Configuration)

Figure 1:
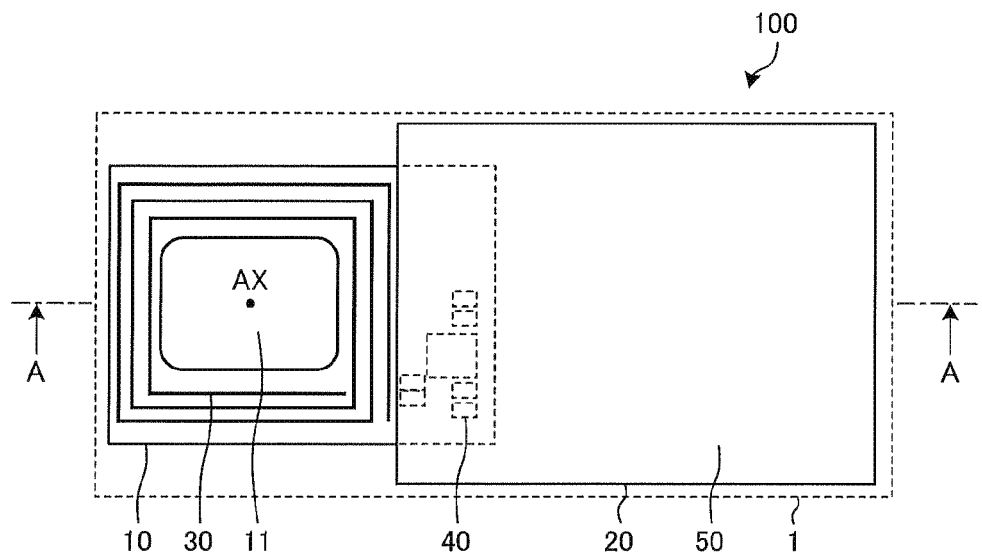
FIG. 1 is a plan view schematically illustrating an internal configuration of a power reception device according to a first embodiment.

FIG. 1 is a plan view schematically illustrating an internal configuration of a power reception device according to Embodiment 1.

Figure 2:
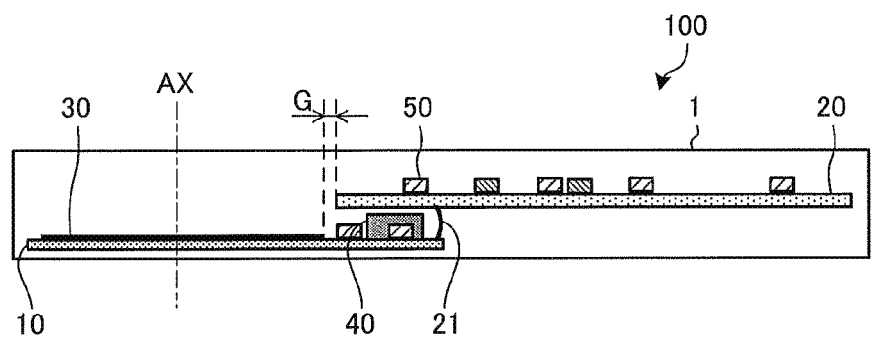
FIG. 2 is a diagram schematically illustrating a cross section taken along line A-A in FIG. 1.

FIG. 2 is a diagram schematically illustrating a cross section taken along line A-A in FIG. 1.

As illustrated in FIGS. 1 and 2, a power reception device 100 includes a first substrate 10 and a second substrate 20 both housed in a housing 1.

On the first substrate 10, a power reception coil 30 and a power reception circuit 40 are mounted.

The power reception coil 30 receives power through magnetic resonance. The power reception coil 30 is a flat coil in which a wiring pattern such as copper foil is spirally formed. It should be noted that the power reception coil 30 is not limited to the wiring pattern, and may be formed by spirally winding an arbitrary conductive line and may be mounted on the first substrate 10. Furthermore, the power reception coil 30 may be formed to have a plurality of layers stacked.

It should be noted that at an inner peripheral portion of the power reception coil 30 on the first substrate 10, a cutout portion 11, which is a through hole extending through the first substrate 10, is formed. It should be noted that it is not indispensable that the cutout portion 11 is formed; that is, no cutout portion 11 may be provided.

The power reception circuit 40 converts power received by the power reception coil 30 into direct current. A detailed configuration of the circuit configuration will be described later.

The power reception coil 30 and the power reception circuit 40 are connected by a wiring pattern formed on the first substrate 10. The positions of the power reception coil 30 and the power reception circuit 40 on the first substrate 10 will be described with reference to FIG. 3.

Figure 3:
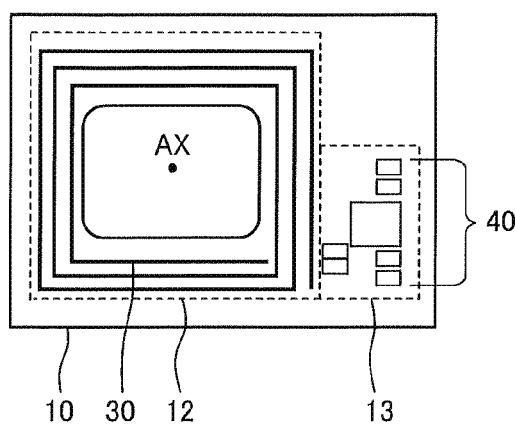
FIG. 3 is a plan view for explaining the positions of a power reception coil and a power reception circuit of the power reception device according to Embodiment 1.

FIG. 3 is a plan view for explaining the positions of the power reception coil and the power reception circuit of the power reception device according to Embodiment 1.

As illustrated in FIG. 3, at the first substrate 10, a first region 12 and a second region 13 are adjacent to each other as viewed in a direction along an axis AX of the power reception coil 30; and in the first region 12, the power reception coil 30 is provided, and in the second region 13, the power reception circuit 40 is provided. That is, the power reception coil 30 and the power reception circuit 40 are provided on the first substrate 10 such that the wiring pattern connecting the power reception coil 30 and the power reception circuit 40 is set to have the shortest possible length.

The following description is made with reference to FIGS. 1 and 2.

On the second substrate 20, a load circuit 50 is mounted. The load circuit 50 is operated by the direct current obtained by conversion performed by the power reception circuit 40. The load circuit 50 and the power reception circuit 40 are connected by a wire 21. The wire 21 is, for example, a conductive line that is made of an arbitrary metal coated with an insulating film.

The second substrate 20 is provided outside the power reception coil 30 as viewed in the direction along the axis AX of the power reception coil 30. For example, as illustrated in FIG. 2, the second substrate 20 is provided such that an end of the second substrate 20 that is closer to the power reception coil 30 is separated from an outer peripheral end of the power reception coil 30 by a distance G.

The power reception circuit 40 on the first substrate 10 overlaps with at least part of the second substrate 20 as viewed in the direction along the axis AX of the power reception coil 30.

Figure 4:
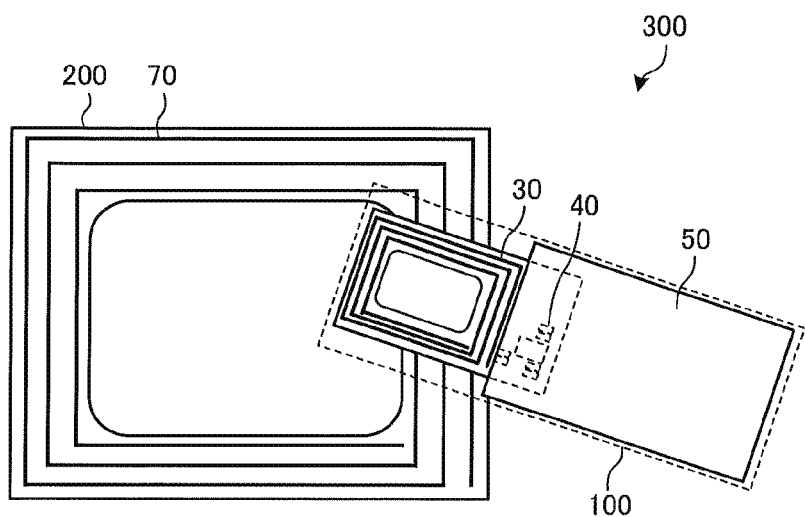
FIG. 4 is a diagram schematically illustrating a schematic configuration of a contactless power transmission system according to Embodiment 1.

FIG. 4 is a diagram illustrating a schematic configuration of a contactless power transmission system according to Embodiment 1.

As illustrated in FIG. 4, a contactless power transmission system 300 includes a power reception device 100 and a power transmission device 200 that transmits power to the power reception device 100.

The power transmission device 200 includes a power transmission coil 70 that transmits power with magnetic resonance.

The power transmission coil 70 is a flat coil in which a substrate wiring pattern such as copper foil is spirally formed. It should be noted that the power transmission coil 70 is not limited to the wiring pattern, and may be formed by spirally winding an arbitrary conductive wire. Also, the power transmission coil 70 may be formed by stacking a plurality of layers.

It should be noted that although FIG. 4 illustrates the case where the size of the power transmission coil 70 is greater than that of the power reception coil 30, the embodiment is not limited to this case, and the size of the power transmission coil 70 may be nearly equal to that of the power reception coil 30. Furthermore, the power reception coil 30 and the power transmission coil 70 may be circular or elliptical.

When located within the range of a magnetic field produced by the power transmission coil 70, the power reception coil 30 of the power reception device 100 receives power through magnetic resonance. Power transmission using magnetic resonance will be described in detail with reference to FIGS. 5 and 6.

(Power Transmission Using Magnetic Resonance)

Figure 5:
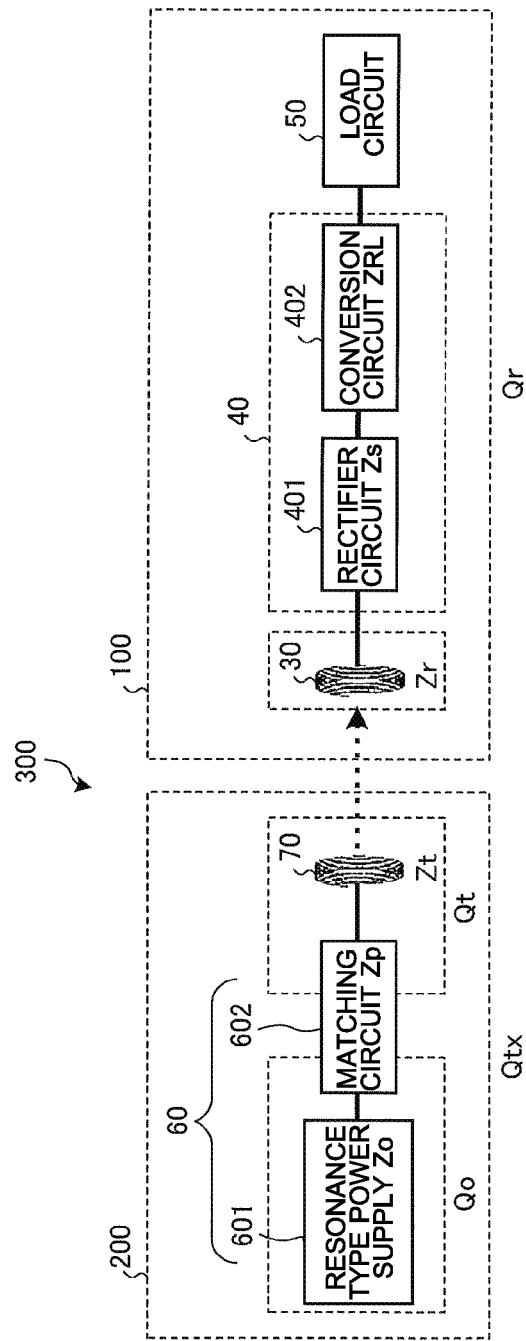
FIG. 5 is a diagram illustrating a configuration of a power transmission device and the power reception device according to Embodiment 1.

FIG. 5 is a diagram illustrating configurations of the power transmission device and the power reception device according to Embodiment 1.

Figure 6:
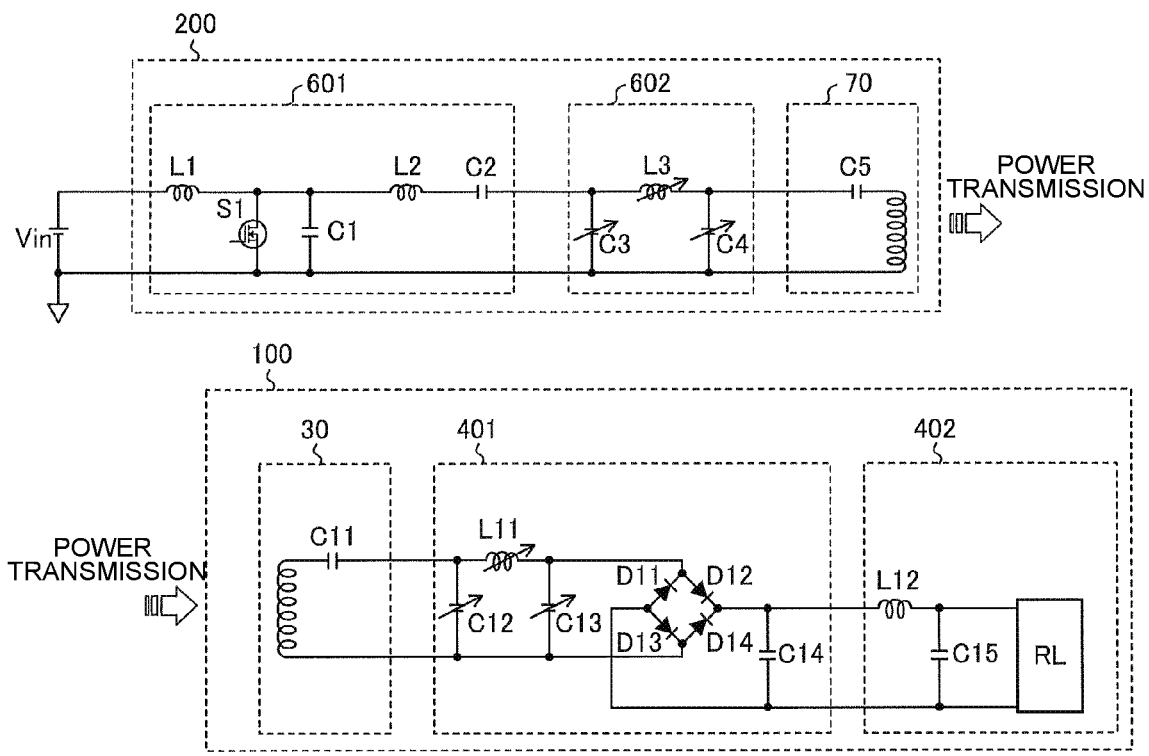
FIG. 6 is a specific circuit diagram of the configuration as illustrated in FIG. 5.

FIG. 6 is a specific circuit diagram of the configuration as illustrated in FIG. 5.

The power reception device 100 and the power transmission device 200 are included in a magnetic resonance type of contactless power transmission system 300 that performs power transmission using resonance characteristics. That is, the power transmission device 200 is provided as a resonance type power transmission device that transmits power to the power reception device 100 through magnetic resonance. The power reception device 100 is provided as a resonance type power reception device that receives power from the power transmission device 200 through magnetic resonance. It should be noted that power transmission using magnetic resonance is also referred to as resonance coupling type power transmission.

As illustrated in FIGS. 5 and 6, the power transmission device 200 includes a power transmission circuit 60 that forms an inverter circuit that supplies power to the power transmission coil 70.

The power transmission circuit 60 includes a resonance type power supply 601 and a matching circuit 602.

The resonance type power supply 601 controls supply of power to the power transmission coil 70, and converts input DC power or AC power into alternating current of a predetermined frequency and outputs the alternating current. The resonance type power supply 601 is a resonant switching power supply circuit that includes a semiconductor switching element S1. The resonance type power supply 601 has an output impedance Zo, a resonance frequency fo, and a resonance characteristic value Qo. The resonance frequency fo of the resonance type power supply 601 is set to a frequency in the MHz band. The resonance frequency fo is, for example, 6.78 MHz. It should be noted that the resonance frequency fo is not limited to this, and may be a frequency that is an integral multiple of 6.78 MHz in the MHz band.

The matching circuit 602 performs impedance matching between an output impedance Zo of the resonance type power supply 601 and a pass characteristic impedance Zt of the power transmission coil 70. The matching circuit 602 includes a 7C or L filter including an inductor L and a capacitor C, and has a pass characteristic impedance Zp.

When AC power is input from the resonance type power supply 601 to the power transmission coil 70 via the matching circuit 602, the power transmission coil 70 performs a resonance operation, and produces a non-radiation electromagnetic field in the vicinity of the power transmission coil 70, thereby transmitting power to the power reception coil 30 of the power reception device 100. The power transmission coil 70 along with a capacitor C5 forms a resonance circuit. The power transmission coil 70 serves as a resonant antenna. The power transmission coil 70 has the pass characteristic impedance Zt, a resonance frequency ft, and a resonance characteristic value Qt.

The resonance frequency fo and the resonance characteristic value Qo of the resonance type power supply 601 depend on the output impedance Zo of the resonance type power supply 601 and the pass characteristic impedance Zp of the matching circuit 602. The resonance frequency ft and the resonance characteristic value Qt of the power transmission coil 70 depend on the pass characteristic impedance Zt of the power transmission coil 70 and the pass characteristic impedance Zp of the matching circuit 602.

From the two resonance characteristic values Qo and Qt, the power transmission device 200 has a resonance characteristic value Qtx as indicated by the following equation (1).

[Math. 1]

$$Qtx = \sqrt{(Qo \cdot Qt)} \quad (1)$$

The power reception circuit 40 of the power reception device 100 includes a rectifier circuit 401 and a conversion circuit 402.

The power reception coil 30 receives power by performing a resonance coupling operation with a non-radiation electromagnetic field from the power transmission coil 70, and outputs AC power. The power reception coil 30 forms, along with a capacitor C11, a resonance circuit. The power reception coil 30 serves as a resonant antenna. The power reception coil 30 has a pass characteristic impedance Zr.

The rectifier circuit 401 is a matching type rectifier circuit that has a rectifying function to convert AC power from the power reception coil 30 into DC power, and a matching function to perform impedance matching between the pass characteristic impedance Zr of the power reception coil 30 and the input impedance ZRL of the conversion circuit 402. The matching function is fulfilled by a 7C or L filter that includes an inductor L and a capacitor C. The rectifier circuit 401 has a pass characteristic impedance Zs. Although it is described above that the rectifier circuit 401 has the rectifier function and the matching function, it is not limitative. The rectifier circuit 401 may be configured to have the rectifying function only, though such a configuration causes a rectification efficiency to be reduced.

The conversion circuit 402 receives DC power from the rectifier circuit 401, converts the DC power into a predetermined voltage, and applies the voltage to the load circuit 50. The conversion circuit 402 includes an LC filter, a DC/DC converter, etc., and has an input impedance ZRL. The LC filter smooths a high-frequency voltage ripple, and the DC/DC converter performs conversion to obtain a predetermined voltage. It should be noted that the conversion circuit 402 may be formed to include the LC filter only, which is a smoothing filter, without including the DC/DC converter.

A resonance characteristic value Qr and a resonance frequency fr of the power reception device 100 depend on the pass characteristic impedance Zr of the power reception coil 30, the pass characteristic impedance Zs of the rectifier circuit 401, and the input impedance ZRL of the conversion circuit 402.

The characteristic impedances of functional units are set such that the resonance characteristic value Qo of the resonance type power supply 601, the resonance characteristic value Qt of the power transmission coil 70, and the resonance characteristic value Qr of the power reception device 100 have a correlation. That is, the resonance characteristic value Qtx ($=\sqrt{(Qo \cdot Qt)}$) of the power transmission device 200 and the resonance characteristic value Qr of the power reception device 100 are approximated to each other (formula (2) below).

Specifically, the range indicated by the following formula (3) is desirable.

[Math. 2]

$$\sqrt{(Qo \cdot Qt)} \approx Qr \quad (2)$$

[Math. 3]

$$0.5 Qr \leq \sqrt{(Qo \cdot Qt)} \leq 1.5 Qr \quad (3)$$

As described above, the three resonance characteristic values that are the resonance characteristic value Qo of the resonance type power supply 601, the resonance characteristic value Qt of the power transmission coil 70, and the resonance characteristic value Qr of the power reception device 100 are correlated with each other as indicated above, whereby a decrease in power transmission efficiency can be reduced. Therefore, in the power transmission by the magnetic resonance method, the distance between the power transmission coil 70 and the power reception coil 30 can be increased as compared with the power transmission by the electromagnetic induction method. It should be noted that the power transmission by the electromagnetic induction method is also referred to as electromagnetic induction coupling type power transmission.

The semiconductor switching element S1 is formed of, for example, a wide-bandgap semiconductor. A wide-bandgap semiconductor is a general term for semiconductor elements having a larger bandgap than that of silicon. The wide-bandgap semiconductor is silicon carbide, a gallium-nitride-based material, diamond, or gallium nitride.

Since the semiconductor switching element S1 is formed of a wide-bandgap semiconductor, the conduction loss of the semiconductor switching element S1 can be reduced. In addition, even when the switching frequency at which the semiconductor switching element S1 is driven is set to a high frequency, heat dissipation at the resonance type power supply 601 is satisfactory. Therefore, a radiating fin provided in the resonance type power supply 601 can be made smaller, and the resonance type power supply 601 can be made smaller and manufactured at a lower cost.

(Operation)

Next, the operation of the contactless power transmission system 300 according to Embodiment 1 will be described.

A user places the power reception device 100 on the power transmission device 200. For example, the power reception device 100 is placed such that the power reception coil 30 of the power reception device 100 faces the power transmission coil 70 of the power transmission device 200. It should be noted that as described above, in the power transmission by the magnetic resonance method, the distance within which the power transmission can be achieved is long. Thus, the position of the power reception coil 30 is not limited to a position at which the power reception coil 30 faces the power transmission coil 70, and it suffices that the power reception coil 30 is located within a range in which the power reception coil 30 can receive power from the power transmission coil 70 using magnetic resonance.

When the power transmission circuit 60 of the power transmission device 200 operates, a high-frequency current is supplied from the power transmission circuit 60 to the power transmission coil 70, and a magnetic field is thus produced from the power transmission coil 70. As a result, power is supplied from the power transmission coil 70 to the power reception coil 30 of the power reception device 100 using magnetic resonance. The power received by the power reception coil 30 is converted into direct current by the power reception circuit 40, and the direct current is supplied to the load circuit 50.

It will be described how a magnetic field that acts on power reception of the power reception coil 30 affects the load circuit 50.

Figure 7:
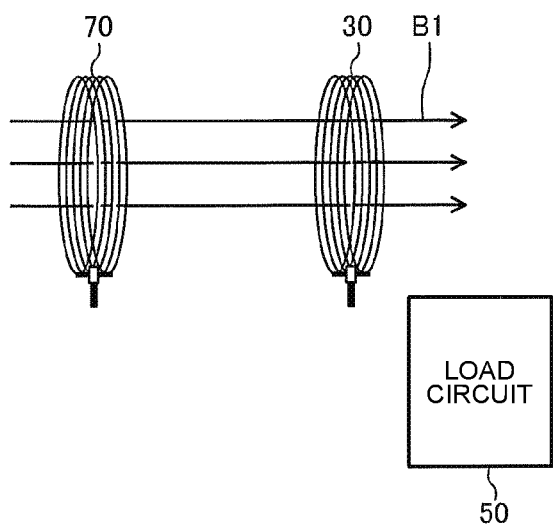
FIG. 7 is a diagram illustrating the positions of a load circuit and a magnetic field that acts on the power reception coil of the contactless power transmission system according to Embodiment 1.

FIG. 7 is a diagram for explaining the positions of the load circuit and a magnetic field that acts on the power reception of the power reception coil of the contactless power transmission system according to Embodiment 1.

As illustrated in FIG. 7, a magnetic field produced in the axial direction of the power transmission coil 70 passes through the power reception coil 30, which is provided opposite to the power transmission coil 70. When the magnetic field B1 passes through the power reception coil 30, a high-frequency induced voltage is produced in the power reception coil 30.

As illustrated in FIGS. 1 and 2, the load circuit 50 is mounted on the second substrate 20. The second substrate 20 is located outside the power reception coil 30 as viewed in the direction along the axis AX of the power reception coil 30. That is, the magnetic field B1 that acts on the power reception of the power reception coil 30 does not pass through the load circuit 50.

Thus, the power reception coil 30 is not magnetically affected by the load circuit 50, and a flux linkage of the power reception coil 30 is not reduced. It is therefore possible to improve a contactless power feeding efficiency. This is because even if the distance between the power transmission device 200 and the power reception device 100 is great, it is possible to produce an induced voltage in the power reception coil 30 and also to operate the load circuit 50, thereby improving the usability of the contactless power transmission system 300.

Figure 8:
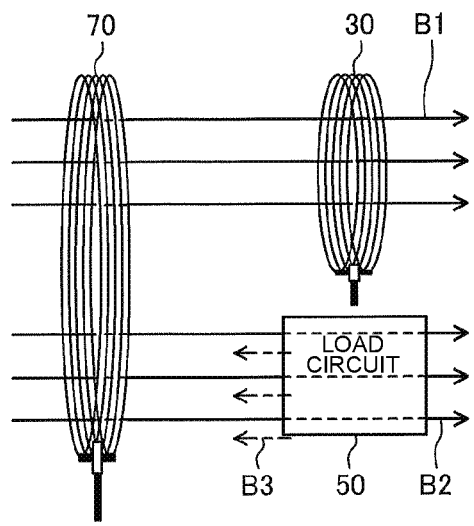
FIG. 8 is a diagram for explaining the positions of the load circuit and the magnetic field that acts on the power reception coil of the contactless power transmission system according to Embodiment 1.

FIG. 8 is a diagram for explaining the positions of the load circuit and a magnetic field that acts on the power reception of the power reception coil of the contactless power transmission system according to Embodiment 1.

As illustrated in FIG. 8, when the magnetic field B2 from the power transmission coil 70 passes through the load circuit 50, a magnetic field B3 is produced from the load circuit 50. To be more specific, at the load circuit 50, an electrical current-loop path, that is, an electrically closed circuit, is provided by electrical components such as an LED or a microcomputer that form the load circuit 50 and a wiring pattern such as copper foil that electrically connects the electronic component. When the magnetic field B2 passes through the electrically closed circuit provided at the load circuit 50, a high-frequency induced voltage is produced. Then, current flows through the electrically closed circuit of the load circuit 50, thereby producing a magnetic field B3 that acts in the opposite direction to a direction where the magnetic field B2 acts.

As illustrated in FIGS. 1 and 2, the load circuit 50 is mounted on the second substrate 20. The second substrate 20 is located outside the power reception coil 30 as viewed in the direction along the axis AX of the power reception coil 30.

That is, the magnetic field B3 produced from the load circuit 50 does not pass through the power reception coil 30, and the magnetic field B1 that acts on the power reception of the power reception coil 30 is not canceled by the magnetic field B3 that acts in the opposite direction to the direction where the magnetic field B1 acts.

Thus, the power reception coil 30 is not magnetically affected by the load circuit 50, and the flux linkage of the power reception coil 30 is not reduced. It is therefore possible to improve a contactless power feeding efficiency. This is because even if the distance between the power transmission device 200 and the power reception device 100 is great, it is possible to produce an induced voltage in the power reception coil 30 and also to operate the load circuit 50, thereby improving the usability of the contactless power transmission system 300.

(Advantage)

As described above, in Embodiment 1, the power reception device 100 includes the first substrate 10 on which the power reception coil 30 and the power reception circuit 40 are mounted, and the second substrate 20 which is provided outside the power reception coil 30 as viewed in the direction along the axis AX of the power reception coil 30 and on which the load circuit 50 is mounted.

Therefore, the inductance of a connection path between the power reception coil 30 and the power reception circuit 40 can be reduced to a small value, as compared with the case where the power reception circuit 40 is mounted on the second substrate 20 which is provided separate from the first substrate 10. It is therefore possible to reduce a power loss and a high-frequency noise between the power reception coil 30 that receives power using magnetic resonance and the power reception circuit 40.

Furthermore, since a wire such as a lead that connects the power reception coil 30 and the power reception circuit 40 is unnecessary, it is possible to reduce the frequency of occurrence of high-frequency noise and also that of occurrence of malfunction of the load circuit 50.

Furthermore, even if an electrically closed circuit is provided in the load circuit 50, the magnetic field B3 produced from the load circuit 50 does not cancel the magnetic field B1 acting on the power reception of the power reception coil 30.

Therefore, the distance between the power reception coil 30 and the load circuit 50 does not need to be set great. Also, since it is not necessary to provide, for example, a magnetic sheet between the power reception coil 30 and the load circuit 50, it is possible to improve the contactless power feeding efficiency and to make the power reception device 100 smaller. In addition, since it is not necessary to provide a shield plate or a magnetic sheet, the manufacturing cost of the power reception device can be reduced.

Furthermore, since an electrically closed circuit can be provided in the load circuit 50, it is possible to improve the flexibility in designing the wiring pattern on the second substrate 20 on which the load circuit 50 is mounted. Therefore, the number of components provided on the load circuit 50 mounted on the second substrate 20 can be increased, and the performance of the power reception device 100 can be made higher.

In Embodiment 1, in the first substrate 10, the first region 12 in which the power reception coil 30 is located is adjacent to the second region 13 in which the power reception circuit 40 is located, as viewed in the direction along the axis AX of the power reception coil 30. That is, the power reception coil 30 and the power reception circuit 40 are provided on the first substrate 10 such that the wiring pattern connecting the power reception coil 30 and the power reception circuit 40 is set to have the shortest possible length.

Thus, the inductance of the connection path between the power reception coil 30 and the power reception circuit 40 can be reduced. It is therefore possible to reduce a power loss and a high-frequency noise between the power reception coil 30 and the power reception circuit 40 which receive power by magnetic resonance.

Moreover, in Embodiment 1, the power reception circuit 40 on the first substrate 10 is covered by at least part of the second substrate 20 as viewed in the direction along the axis AX of the power reception coil 30.

Therefore, the length of the wire 21 connecting the power reception circuit 40 and the load circuit 50 can be shortened. In addition, the power reception device 100 can be made small, as compared with the case where the first substrate 10 and the second substrate 20 are provided such that they do not overlap with each other.

In the contactless power transmission system 300 according to Embodiment 1, power is transmitted from the power transmission device 200 to the power reception device 100 using magnetic resonance.

Therefore, the restriction on the position of the power reception device 100 to which power is transmitted from the power transmission device 200 can be reduced, as compared with the power transmission being performed by the electromagnetic induction coupling. In addition, even in the case where the power transmission coil 70 and the power reception coil 30 are not provided to face each other, power transmission can be achieved. Therefore, it is possible to improve the flexibility in setting the position of the power reception device 100 and to improve the usability.

Embodiment 2

In Embodiment 2, a configuration in which the power reception device 100 is applied to a remote controller will be described.

It should be noted that components that are the same as those in Embodiment 1 will be denoted by the same reference numerals, and Embodiment 2 will be described by referring mainly to the differences between Embodiments 1 and 2.

Figure 9:
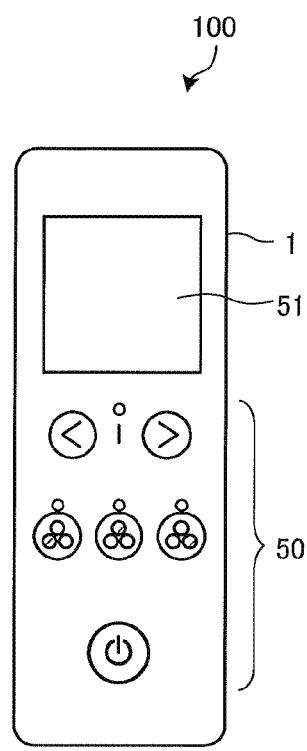
FIG. 9 is a plan view illustrating an external appearance of a power reception device according to Embodiment 2.

FIG. 9 is a plan view illustrating an external appearance of the power reception device according to Embodiment 2.

Figure 10:
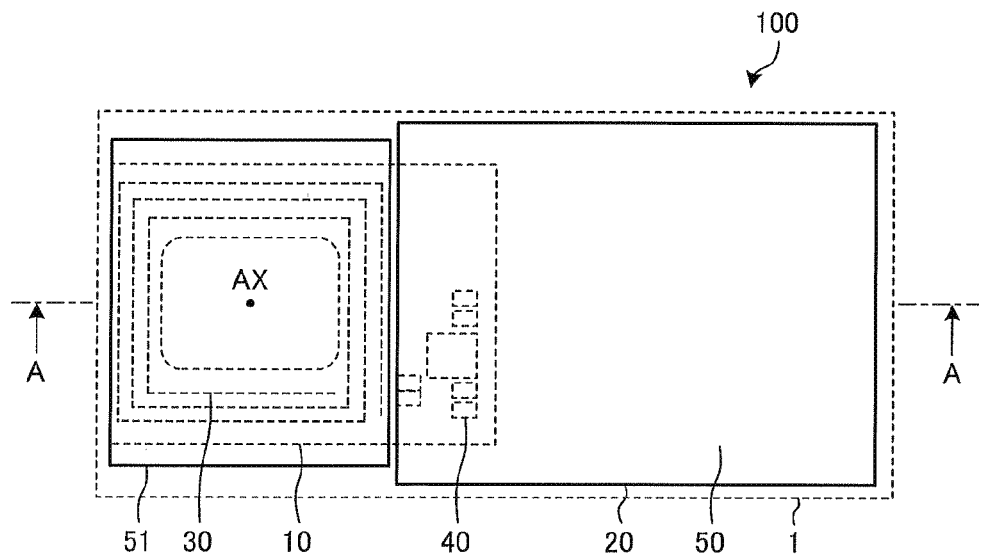
FIG. 10 is a plan view schematically illustrating an internal configuration of the power reception device according to Embodiment 2.

FIG. 10 is a plan view schematically illustrating an internal configuration of the power reception device according to Embodiment 2.

Figure 11:
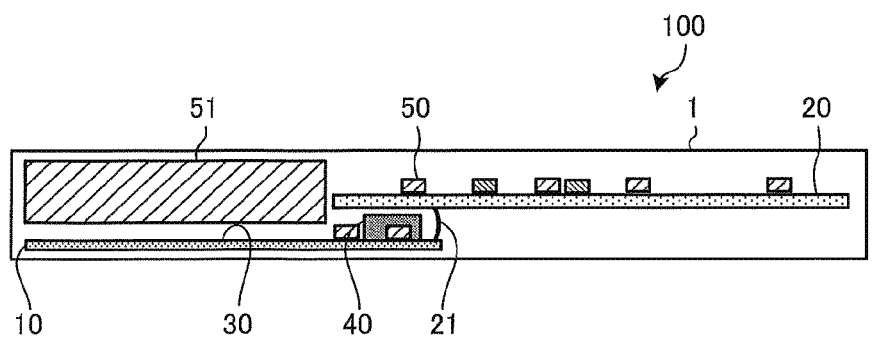
FIG. 11 is a diagram schematically illustrating a cross section taken along line A-A in FIG. 10.

FIG. 11 is a diagram schematically illustrating a cross section taken along line A-A in FIG. 10.

As illustrated in FIGS. 9 to 11, the power reception device 100 according to Embodiment 2 also functions as a remote controller. The power reception device 100 includes a load circuit 50 and a second load circuit 51 that are supplied with power from the power reception circuit 40.

The load circuit 50 includes electronic components such a microcomputer and an operation switch that performs an operation related to an operation input to the remote controller. Furthermore, the load circuit 50 includes electronic components that form a transmission unit and a reception unit. The transmission unit transmits operation information to an external device, and the reception unit acquires information from the external device.

The second load circuit 51 is provided in such a manner to overlap with the power reception coil 30 as viewed in the direction along the axis AX of the power reception coil 30. For example, the second load circuit 51 is provided in the housing 1 of the power reception device 100 in such a manner as to face the power reception coil 30 and adjacent to the second substrate 20.

The second load circuit 51 displays information on an operation input by the load circuit 50 or information acquired from an external device. The second load circuit 51 includes, for example, a display component such as a liquid crystal display (LCD) or a light emitting diode (LED). The second load circuit 51 includes a component that does not form an electrically closed circuit. It should be noted that "does not form an electrically closed circuit" means that there is no passage through which current flows in a loop manner.

As described above, in Embodiment 2, the second load circuit 51 includes an electronic component which does not form an electrically closed circuit, and is provided in such a manner as to overlap with the power reception coil 30 as viewed in the direction along the axis AX of the power reception coil 30.

Therefore, the volume of the housing 1 of the power reception device 100 can be effectively used. Furthermore, the second load circuit 51 does not form an electrically closed circuit. Thus, even when a magnetic field from the power transmission coil 70 passes through the second load circuit 51, current does not flow in a loop manner, a magnetic field that cancels the flux linkage of the power reception coil 30 is not produced from the second load circuit 51, and there is no possibility that the contactless power feeding efficiency will be reduced.

Therefore, it is possible to effectively use the volume of the power reception device 100 by providing in a region that faces the power reception coil 30, a component that is not affected by the supply of power to the power reception coil 30, and also possible to provide the power reception device 100 which is compact and easily usable.

Although it is described above by way of example that the second load circuit 51 includes a display component, it is not limitative. Any component or components can be used as the second load circuit 51 as long as the components have a configuration in which a current loop is not provided.

In the case where the second load circuit 51 includes an LCD or an LED as the display component, for example, a microcomputer that controls the operation of the display component may be provided in the load circuit 50, the display component may be provided in the second load circuit 51, and the display component may be electrically connected to the load circuit 50 of the second substrate 20.

The second load circuit 51 is not limited to electronic components. For example, the second load circuit 51 may include a light guide plate. To be more specific, in this case, the load circuit 50 mounted on the second substrate 20 includes, for example, an LED as the display component, and light from the LED is made incident on the light guide plate, which is provided on an upper surface of the power reception coil 30. In such a manner, a backlight of the display unit may be formed to include the light guide plate which is included in the second load circuit 51.

Embodiment 3

In Embodiment 3, a plurality of sets of power reception coils 30 and power reception circuits 40 are provided, and this will be described as follows.

It should be noted that components that are the same as those in Embodiments 1 and/or 2 will be denoted by the same reference numerals, and Embodiment 3 will be described by referring mainly to the differences between Embodiment 3 and Embodiments 1 and 2.

Figure 12:
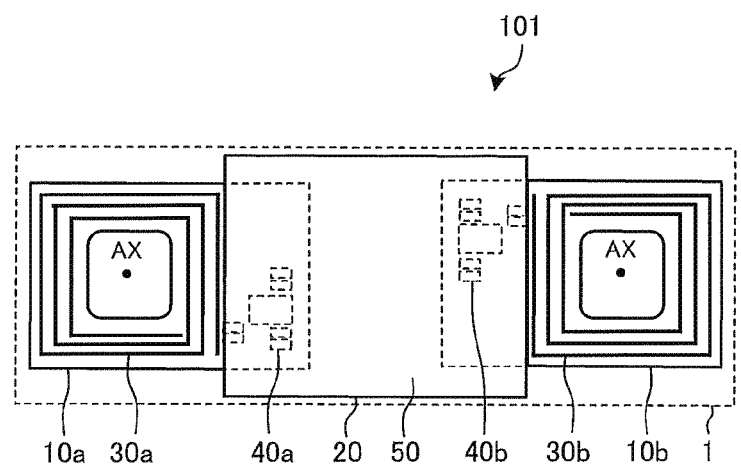
FIG. 12 is a plan view schematically illustrating an internal configuration of a power reception device according to Embodiment 3.

FIG. 12 is a plan view schematically illustrating an internal configuration of a power reception device according to Embodiment 3.

As illustrated in FIG. 12, in Embodiment 3, the power reception device 101 includes a first substrate 10a on which a power reception coil 30a and a power reception circuit 40b are mounted, and a first substrate 10b on which a power reception coil 30b and a power reception circuit 40b are mounted. The load circuit 50 mounted on the second substrate 20 is supplied with power from both the power reception circuit 40a and the power reception circuit 40b.

The second substrate 20 is provided outside the power reception coil 30a as viewed in the direction along the axis AX of the power reception coil 30a. Also, the second substrate 20 is provided outside the power reception coil 30b as viewed in the direction along the axis AX of the power reception coil 30b.

Figure 13:
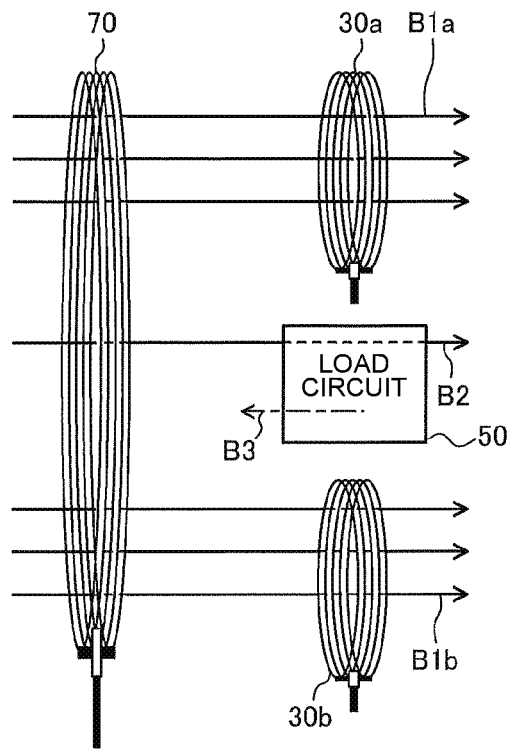
FIG. 13 is a diagram for explaining the positions of a lord circuit and a magnetic field that acts on a power reception coil of a contactless power transmission system according to Embodiment 3.

FIG. 13 is a diagram for explaining the positions of the load circuit and a magnetic field that acts on the power reception of the power reception coil of a contactless power transmission system according to Embodiment 3.

As illustrated in FIG. 13, a magnetic field produced in the axial direction of the power transmission coil 70 passes through the power reception coil 30a. When the magnetic field B1a passes through the power reception coil 30a, a high-frequency induced voltage is produced in the power reception coil 30a.

Also, a magnetic field produced in the axial direction of the power transmission coil 70 passes through the power reception coil 30b. When the magnetic field B1b passes through the power reception coil 30b, a high-frequency induced voltage is produced in the power reception coil 30b.

Furthermore, when the magnetic field B2 from the power transmission coil 70 passes through the load circuit 50, a magnetic field B3 is produced from the load circuit 50. That is, when the magnetic field B2 passes through an electrically closed circuit provided in the load circuit 50, current flows through the electrically closed circuit of the load circuit 50, and the magnetic field B3 is produced in the opposite direction to the direction of the magnetic field B2.

The load circuit 50 is mounted on the second substrate 20. The second substrate 20 is located outside the power reception coil 30a as viewed in the direction along the axis AX of the power reception coil 30a. Also, the second substrate 20 is located outside the power reception coil 30b as viewed in the direction along the axis AX of the power reception coil 30b.

That is, the magnetic field B3 produced from the load circuit 50 passes through neither the power reception coil 30a nor the power reception coil 30b. Thus, the power reception coils 30a and 30b are not magnetically affected by the load circuit 50, and the flux linkages of the power reception coils 30a and 30b are not reduced. Therefore, it is possible to improve the contactless power feeding efficiency.

With respect to Embodiment 3, although the above description refers to the case where two sets of power reception coils 30 and power reception circuits 40 are provided, the embodiment is not limited to such a case, that is, an arbitrary number of sets of power reception coils and power reception circuits 40 may be provided.

As described above, since a plurality of sets of power reception coils 30 and power reception circuits 40 are provided in the power reception device 100, it is possible to enlarge the space in the power reception device 100 where the power reception coils 30 are provided, and also to enlarge the range in which power can be transmitted by the power reception device 100. Therefore, the usability can be further improved.

Embodiment 4

In Embodiment 4, the first substrate 10 and the second substrate 20 are movable, and this configuration will be described as follows.

It should be noted that components that are the same as those of any of Embodiments 1 to 3 will be denoted by the same reference signs, and Embodiment 4 will be described by referring mainly to the differences between Embodiment 4 and Embodiments 1 to 3.

Figure 14:
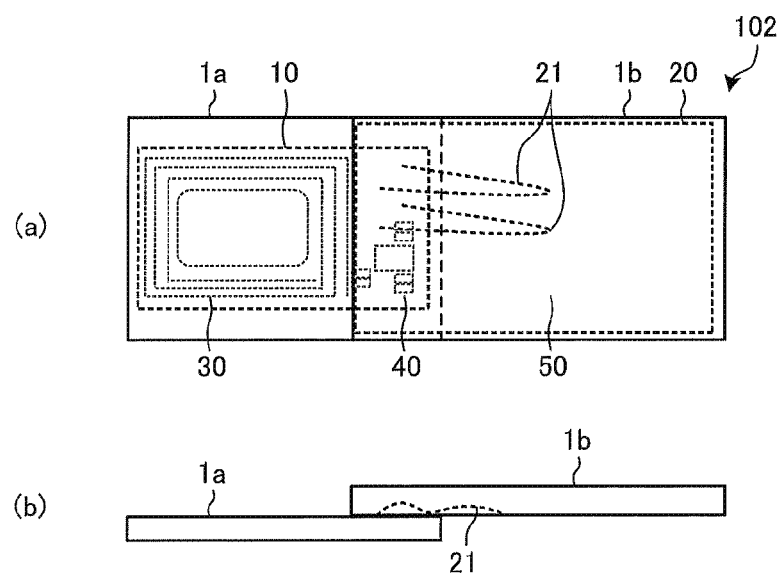
FIG. 14 is a plan view schematically illustrating a configuration of a power reception device according to Embodiment 4.
Figure 15:
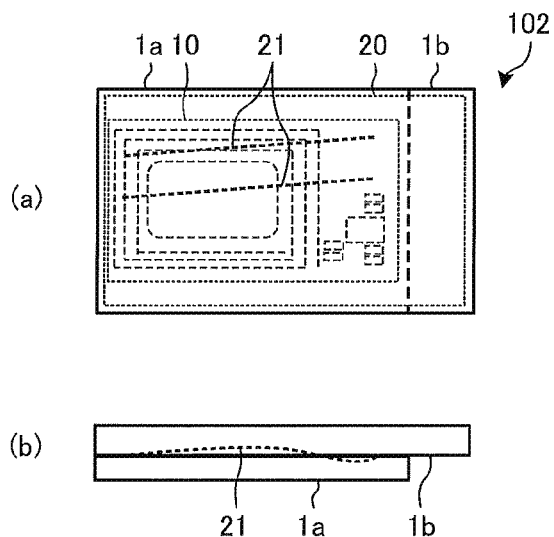
FIG. 15 is another plan view schematically illustrating the configuration of the power reception device according to Embodiment 4.

FIGS. 14 and 15 are plan views schematically illustrating a configuration of a power reception device according to Embodiment 4. FIG. 14 is a diagram illustrating a state in which a first housing 1a and a second housing 1b, which will be described later, have been moved to a first position. FIG. 15 is a diagram illustrating a state in which the first housing 1a and the second housing 1b have been moved to a second position. It should be noted that FIG. 14, (a), and FIG. 15, (a), are plan views schematically illustrating an internal configuration of the power reception device 102, and FIG. 14, (b), and FIG. 15, (b), are schematic diagrams illustrating a side surface of the power reception device 102.

As illustrated in FIGS. 14 and 15, in Embodiment 4, the power reception device 102 includes a first housing 1a that houses the first substrate 10 and a second housing 1b that houses the second substrate 20.

In the power reception device 102, as viewed from the direction of the axis AX of the power reception coil 30, the first housing 1a and the second housing 1b are connected to each other such that the first and second housings 1a and 1b can be moved to a first position where the load circuit 50 is located outside the power reception coil 30 and a second position where the load circuit 50 overlaps with the power reception coil 30, as viewed from the direction of the axis AX of the power reception coil 30.

For example, as illustrated in FIGS. 14 and 15, movable slide mechanisms are attached to the first housing 1a and the second housing 1b, and the first housing 1a is configured to slide relative to the second housing 1b.

Because of the above configuration, in the case where the power reception device 102 receives power from the power transmission device 200, the user moves the first housing 1a to the first position. In the case where the power reception device 102 does not receive power from the power transmission device 200, the user moves the first housing 1a to the second position.

Thus, when the first housing 1a is located at the first position, the power reception device 102 can obtain the same advantages as in Embodiments 1 to 3.

Furthermore, in the case where the first housing 1a is located at the second position, the power reception device 102 can be made smaller, and the usability of the power reception device 102 is improved.

Although the above description refers to the case where the first housing 1a is configured to slide relative to the second housing 1b, it is not restrictive. For example, the first housing 1a and the second housing 1b may be rotatably connected each other. In addition, end portions of the first housing 1a and the second housing 1b may be connected to each other by a hinge mechanism such that that the first and second housings 1a and 1b are rotatable. That is, any configuration can be applied as long as the first housing 1a and the second housing 1b can be moved to the first position where the load circuit 50 is located outside the power reception coil 30 and the second position where the load circuit 50 overlaps with the power reception coil 30.

(Modification)

Figure 16:
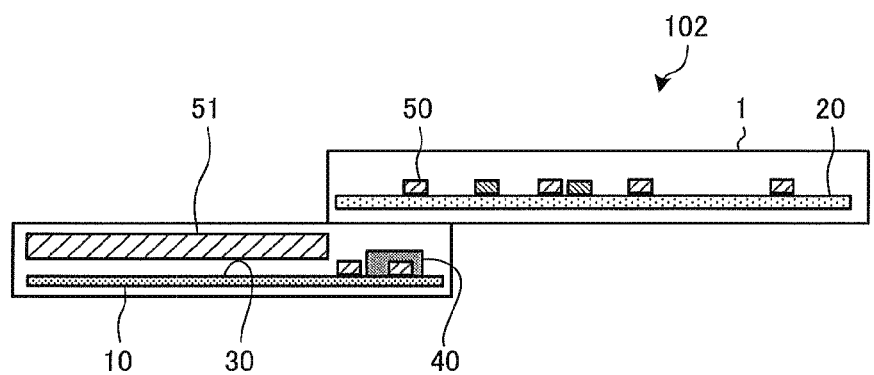
FIG. 16 is a side view illustrating a modification of the configuration of the power reception device according to Embodiment 4.

FIG. 16 is a side view schematically illustrating a modification of the configuration of the power reception device according to Embodiment 4. As illustrated in FIG. 16, the second load circuit 51 that does not form an electrically closed circuit may be provided on the first housing 1a. As in Embodiment 2, the second load circuit 51 is provided in such a manner as to overlap with the power reception coil 30 as viewed in the direction along the axis AX of the power reception coil 30.

Also, in such a configuration, it is possible to effectively use the volume in the power reception device 102, and provide the power reception device 102 which is compact and easily usable.

REFERENCE SIGNS LIST 1 housing, 1a first housing, 1b second housing, 10 first substrate, 10a first substrate, 10b first substrate, 11 cutout portion, 12 first region, second region, 20 second substrate, 21 wire, 30 power reception coil, 30a power reception coil, 30b power reception coil, 40 power reception circuit, 40a power reception circuit, 40b power reception circuit, 50 load circuit, second load circuit, 60 power transmission circuit, 65 power transmission coil, 70 power transmission coil, 80 power reception coil, 100 power reception device, 101 power reception device, 102 power reception device, 200 power transmission device, 300 contactless power transmission system, 401 rectifier circuit, 402 conversion circuit, 601 resonance type power supply, 602 matching circuit

The invention claimed is:

1. A power reception device comprising:
a power reception coil configured to receive power through magnetic resonance;
a power reception circuit configured to convert power received by the power reception coil into direct current;
a load circuit configured to operate by the direct current obtained by conversion performed by the power reception circuit;
a first substrate on which the power reception coil and the power reception circuit are mounted; and
a second substrate on which the load circuit is mounted, the second substrate being located outside a volume above or below the power reception coil with an axial direction of the power reception coil defining a vertical direction,
wherein the power reception circuit is located between at least a part of the first substrate and at least part of the second substrate in the axial direction of the power reception coil.

2. The power reception device of claim 1, wherein the first substrate includes a first region in which the power reception coil is provided and a second region in which the power reception circuit is provided, and the first region and the second region are adjacent to each other in a direction perpendicular to the axial direction of the power reception coil.

3. The power reception device of claim 1, further comprising a second load circuit configured to operate by the direct current obtained by the conversion performed by the power reception circuit, wherein the second load circuit is located at least partly above or below the power reception coil and includes a component which does not form an electrically closed circuit.

4. The power reception device of claim 1, comprising a plurality of sets of the power reception coil and the power reception circuit,
wherein the load circuit is configured to receive power from the plurality of sets of the power reception coils and the power reception circuits.

5. The power reception device of claim 1, further comprising:
a first housing that houses the first substrate; and
a second housing that houses the second substrate,
wherein the first housing and the second housing are connected to each other such that the first housing and the second housing are movable to a first position where the load circuit is located outside the volume above or below the power reception coil and a second position where the load circuit is at least partially located in the volume above or below the power reception coil.

6. The power reception device of claim 1, wherein a resonance frequency of the magnetic resonance is in a MHz band.

7. The power reception device of claim 6, wherein the resonance frequency of the magnetic resonance is 6.78 MHz or an integral multiple of 6.78 MHz.

8. A contactless power transmission system comprising:
a power transmission device including a power transmission coil and an inverter circuit, the power transmission coil being configured to transmit power through magnetic resonance, the inverter circuit configured to supply power to the power transmission coil; and
the power reception device of claim 1.

9. The contactless power transmission system of claim 8, wherein the inverter circuit includes a semiconductor switching element, and the semiconductor switching element is formed of a wide-bandgap semiconductor.

10. The contactless power transmission system of claim 9, wherein the wide-bandgap semiconductor is silicon carbide, a gallium-nitride-based material, diamond, or gallium nitride.

* * * * *